United States Patent [19]

Sabella et al.

[11] Patent Number: 5,430,465
[45] Date of Patent: Jul. 4, 1995

[54] APPARATUS AND METHOD FOR MANAGING THE ASSIGNMENT OF DISPLAY ATTRIBUTE IDENTIFICATION VALUES AND MULTIPLE HARDWARE COLOR LOOK-UP TABLES

[75] Inventors: Paolo Sabella, Pleasanton; Jerald R. Evans, Mountain View; Deron Johnson, Newark, all of Calif.

[73] Assignee: Sun Microsystems, Inc., Mountain View, Calif.

[21] Appl. No.: 221,279

[22] Filed: Mar. 29, 1994

Related U.S. Application Data

[63] Continuation of Ser. No. 756,524, Sep. 9, 1991, abandoned.

[51] Int. Cl.$^6$ .............................................. G09G 5/06
[52] U.S. Cl. .................................... 345/199; 345/150
[58] Field of Search ............... 340/701, 703, 721, 723, 340/798, 799, 734; 345/150, 186, 187, 188, 199, 203

[56] References Cited

U.S. PATENT DOCUMENTS

| | | | |
|---|---|---|---|
| 4,958,301 | 9/1990 | Kobayashi | 340/703 |
| 5,025,249 | 6/1991 | Seiler et al. | 340/721 |
| 5,091,717 | 2/1992 | Carrie et al. | 340/703 |
| 5,128,658 | 7/1992 | Pappas et al. | 340/703 |

OTHER PUBLICATIONS

"Computer Graphics: Principles and Practice", Second Edition, by James D. Foley et al., 1990, pp. 166-170 and 443-447.

"High Performance Polygon Rendering" by Kurt Akeley et al., ACM Computer Graphics, vol. 22, No. 4, 1988, pp. 239-246.

*Primary Examiner*—Jeffery Brier
*Attorney, Agent, or Firm*—Erwin J. Basinski

[57] ABSTRACT

In a bit mapped display environment which has n hardware color look-up tables (CLUTs) where n=1 or more, which also has a limited number of Display Attribute Identification Values, and which may operate under various window systems, such as the X Window System protocol, an apparatus and a method for installing and uninstalling hardware colormaps under the constraint of a finite number of Display Attribute Identification Values, whereby the most recently installed (MRI) policy of the X Window System is followed. The invention provides a scheme which gracefully degenerates to some "color flashing" when Display Attribute Identification Values are exhausted; which allows Display Attribute Identification Values to be uncoupled from colormap management and used for more graphics intensive functions when needed; and which dynamically regenerates when display attributes again become available. The invention also minimizes the rendering of the Display Attribute Planes when a new colormap is installed in a system containing multiple hardware color look-up tables.

12 Claims, 6 Drawing Sheets

DISPLAY ATTRIBUTE VALUE ASSIGNMENT SYSTEM

FIGURE 1 (PRIOR ART)
X WINDOWS SYSTEM DISPLAY RESOURCES

FIGURE 2 (PRIOR ART)

DISPLAY ATTRIBUTE VALUE RELATIONSHIP TO MULTIPLE HARDWARE COLOR LOOK-UP TABLES (CLUTS)

FIGURE . 3 (PRIOR ART)

RELATIONSHIP OF ATTRIBUTE VALUE TAG TO THE DISPLAY ATTRIBUTE TABLE

FIGURE 4
DISPLAY ATTRIBUTE VALUE ASSIGNMENT SYSTEM

WINDOW BINDING STORE

FIGURE 6

APPARATUS AND METHOD FOR MANAGING THE ASSIGNMENT OF DISPLAY ATTRIBUTE IDENTIFICATION VALUES AND MULTIPLE HARDWARE COLOR LOOK-UP TABLES

This is a continuation of application Ser. No. 07/756,524, filed Sep. 9, 1991, now abandoned.

BACKGROUND OF THE INVENTION

1. TECHNICAL FIELD

This invention relates to interactive computer graphics, and more particularly to the field of bit mapped color video display.

2. DESCRIPTION OF RELATED ART AND BACKGROUND

Figure 1:
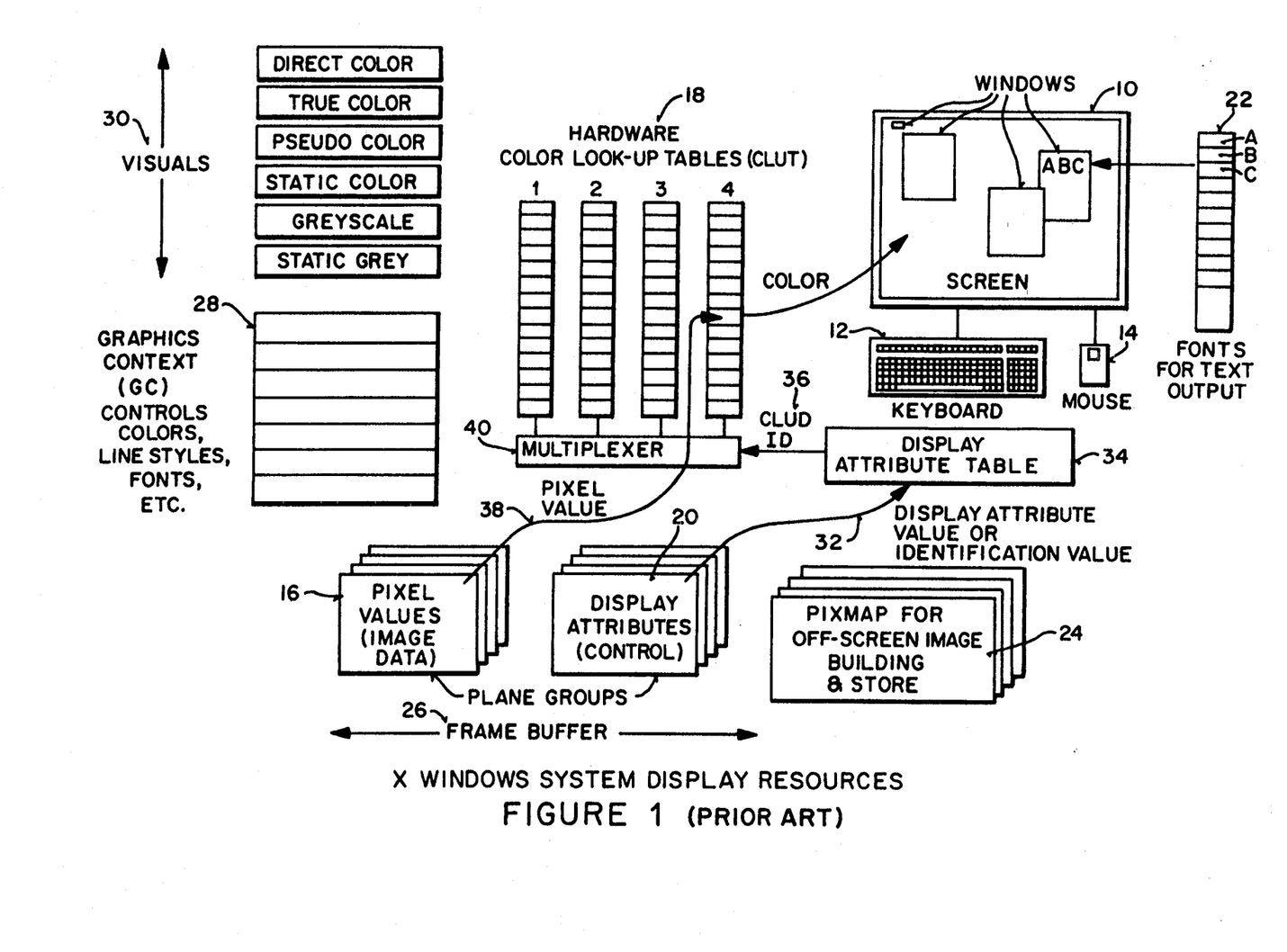
FIG. 1 is a general block diagram illustrating the general environment in which the present invention operates. The items shown are generally well known in the art.

This invention functions in a workstation with graphics display capability supporting multiple windows wherein the hardware may contain one or more hardware color look-up tables (CLUTs), and wherein the system may, in some cases, operate under the X Window System™ protocol. The "X Window System" is a Trademark of the Massachusetts Institute of Technology. In other cases, the invention may operate with other well known window systems such as Microsoft Windows® or Apple Macintosh™ Windows. "Microsoft" and "Microsoft Windows" are registered trademarks of Microsoft Corporation. "Apple" and "Macintosh" are trademarks of Apple Computer Inc. FIG. 1 describes generally this environment, showing the essential resource elements in an X Window System context.

The X Window System is a system supported by a dozen or more computer vendors, through a joint effort to standardize a Windowing System and is well known in the art. The X Window System defines a protocol (the "X Protocol") for handling multiple window display demands. The X Protocol provides for dealing with multiple applications ("clients") which wish to display a window on a video screen regardless of whether the client is local or on a remote host or workstation communicating through a network. The X Protocol also allows for a client to use his own colormap, in an environment that has n hardware color look-up tables (CLUTs), where n=1 or more. A "colormap" is a set of color values used to display colors on a screen and is more fully described below. Most hardware workstations presently support only one hardware color look-up table (CLUT). A general description of the rules used and the operation of the Version 11, X Window System Server (the "X11 Server") in handling color displays of multiple windows, including the use of color look-up tables (CLUTS) can be found in many publications on the X Window System, such as the book titled "X Window System" by Robert W. Scheifler, James Gettys and Ron Newman published by Digital Press in 1988 or "X Window System Programming" by Nabajyati Barkakati, published by SAMS, a division of Macmillan Computer Publishing, Carmel, Ind. in 1991, at pages 341 through 369.

A display screen in the X Window System has a block of memory, known as a "Frame Buffer" or "Video Memory", that is capable of storing a fixed number of bits (usually 1,4, or 8) for each Pixel (the Pixel value) on the screen. The color displayed is a function of the Red, Green, and Blue (RGB) values obtained from the colormap by means of the Pixel value. The video hardware used in most X Window System displays can use only one colormap at a time, which creates the notion of "installing" a colormap into the hardware color look-up table (CLUT).

Accordingly, the various elements depicted in FIG. 1 are generally well known in the art, but form an environment in which the present invention may function and in which the presently preferred embodiment of the disclosed invention does function. In FIG. 1, a computer display 10 containing multiple windows, with an associated keyboard 12 and mouse 14 are shown related to the elements involved in a color display system. Images which are to appear in a window on a screen are stored in a drawing or Image Data Plane Group 16 which contains pixel values and which is part of a Frame Buffer 26 (with one or more bit planes). Some attributes of the video display of the pixel, such as which CLUT is used or which plane group is used, are stored in the Display Attributes Plane Group 20 which may also be part of the Frame Buffer 26. The Display Attribute Value or Identification Value 32, when present, is typically used as an index into a Display Attribute Table 34 which contains various data including the identification of a particular hardware color look-up table (CLUT) or CLUT ID 36, where multiple CLUTs are available. The Display Attribute Identification Value 32 is sometimes called a display tag, window id, display id, or attribute id. In this discussion we shall refer to this value as a "Display Attribute Identification Value" (the "DAIV"). The color of the displayed window painted on the screen is derived from the values in a colormap stored in one of the Hardware Color Look-up Tables (CLUTs) 18, which translate pixel values into colors ( which are composed of different intensities of the primary colors: Red, Green, and Blue (RGB)).

The X Windows System encapsulates the common features of display hardware in a data structure called a "Visual", which contains all the information that characterizes the display. When a window is created an associated Visual must be specified. In the X Windows System, "Visuals" include the following classes:

"DirectColor" Visuals model the display type in which the pixel value is decomposed into bit fields that index into individual colormaps for the R, G, B components. The colormap entries can be dynamically changed.

"TrueColor" Visual displays are the same as DirectColor but their colormaps are fixed.

"PseudoColor" Visuals model a display hardware where each pixel value looks up an RGB value and the colormap can be modified any time.

"StaticColor" Visual displays are similar to PseudoColor except that the colormap cannot be modified.

"GreyScale" Visuals model a greyscale monitor that allows the intensity of the map to be modified.

"StaticGrey" Visuals are similar to GreyScale but with a fixed grey level map.

These concepts will be made clear by a more detailed summary of how color is displayed on a bit mapped display. The displays on graphical computer terminals are generated by reading a "bitmap" (i.e., a storage array of "1s" and "Os" corresponding to the intensity pattern of the screen display) and using the bits to intensity modulate the light output of the display. Each particular dot on the screen is referred to as a pixel and the intensity value for a particular dot is called the pixel value. Pixel values are commonly stored in frame buffers or video memory and may be thought of as a buffer organized in a number of bit planes with as many bit planes as there are bits in each Pixel value. The number of bits in each Pixel value (i.e. the number of bit planes used) is also known as the "depth" of the display. The number of bits allow $2^4$ or 16 different scale values for the image on the screen. Many more values of screen intensity can be allowed by using the Pixel value as an entry to a look-up table (LUT) of intensity values to pick the actual value to use to activate the Pixel. For example, a look-up table of 16 bit values would contain $2^s=65,536$ intensity values even though using the 4 bit Pixel value as an index into this look-up table would allow the use of only $2^4=16$ of these 65,536 values at any one time. Raster scanned color displays represent any color by combinations of the three primary colors: Red (R), Green (G), and Blue (B). A bit mapped display converts the pixel value into light intensities by mixing three primary colors. In such color displays, the Pixel values either represent the color values (i.e., Red, Green, and Blue (RGB)) or an address in a color look-up table (CLUT) containing the RGB color values as described above. The specific list of color values stored in a color look-up table is referred to as a "colormap". In this context, we shall use the term "Colormap" (with a capital C) to refer to a Colormap Object which contains an augmented data structure (i.e. contains other data besides just the red, green, and blue values) and possibly a number of "program operators". A "Program Operator" is a set of instructions which may be thought of as causing the system to perform a specific task.

The principal function of a window system such as the X Window System is the management of hardware resources. In the X Window System, Clients (application programs) do not access the actual display hardware such as the frame buffer or the hardware color look-up table (CLUT). Instead the Client references the X Windows System objects (software constructs) "Window" and "Colormap" respectively. Each Client requests the X11 Server to render into portions of a Window that the Client owns instead of rendering directly to the Frame Buffer. The X11 Server enforces a stacking order which in turn regulates which portion of a window is visible on the display screen. Similarly, a Client allocates colors in an X Window System Colormap Object instead of directly loading the actual hardware CLUT. The pixels rendered into a window on behalf of a Client appear correctly only when the Client's colormap is installed into a CLUT via the XInstallColormap request.

In a display system containing only one CLUT, when more than one Client requests more than one colormap for their respective applications, only those windows for which the colormap has been installed will appear correctly displayed. All other windows which do not use the currently installed colormap will have false colors displayed for all pixel values where their related colormaps differ from the colormap actually installed. This phenomenon is referred to as "flashing".

There are conventions and strategies used to insure that Clients share the hardware CLUT in a well ordered fashion leading to a reduction in flashing. The most common convention is the "Interclient Communication Conventions" (ICCCM) developed by Rosenthal.

To further alleviate the problem of "Flashing", new display hardware is being intr marketplace with more than one Hardware Color Look-up Table (CLUT). This introduces the added complexity of having to keep track of which particular hardware CLUT contains the colormap for each window. Moreover, newer hardware workstations provide multiple CLUTs with different depths. For example, a given workstation might provide for two 4-bit CLUTs and four 24-bit CLUTs. In addition, workstation hardware vendors are providing units with advanced Frame Buffers consisting of more than a single group of bit planes for holding displayed images. Some Frame Buffers have 100 or more bits per pixel divided into separate plane groups serving various functions. These plane groups may hold data (i.e. images to be displayed, overlays, and Z-buffers) or control information (i.e. hardware clipping ids and video display attribute identification values). Moreover they are large enough to allow applications to use two drawing (image) plane groups alternatively where double buffering is required (i.e. writing from one image plane group while updating the other, and then writing from the alternate plane group while updating the first). Animation type displays use such double buffering techniques. A Z-buffer is a buffer, typically of the same size as the frame buffer of the related image, which is used to specify the visible surface determination for creating realistic three dimensional (3D) images. Only windows containing 3D images require/use Z-buffers. Clipping ids are per-pixel tags which identify that part of the window image which shows on the screen. These new hardware multiple plane group features provide the resources for handling multiple complex display windows simultaneously. For example, one screen could contain the following: one window which displays an interactive 3D application in a 24-bit Red, Green, Blue (RGB) format; another window displaying an Engineering Computer Aided Design (ECAD) application in an 8-bit pseudocolor format; an interaction panel, a clock, and several icons displayed as 4-bit pseudocolor windows. This combination of multiple windows, multiple depths (i.e. number of bits in the pixel value), and multiple color displays requires that the server not only be able to manipulate the various plane groups involved, but also control the hardware CLUT resources in a way which minimizes the visible color display problems which might arise because of rapid colormap changes. While the X Window System defines a protocol for dealing with Frame Buffers which support multiple images with multiple depths, the X Protocol does not specify how to do it. The present invention is a scheme for actually managing such complicated requirements and resource combinations efficiently and in a generalized way while conforming to the general X11 Server model.

Figure 2:
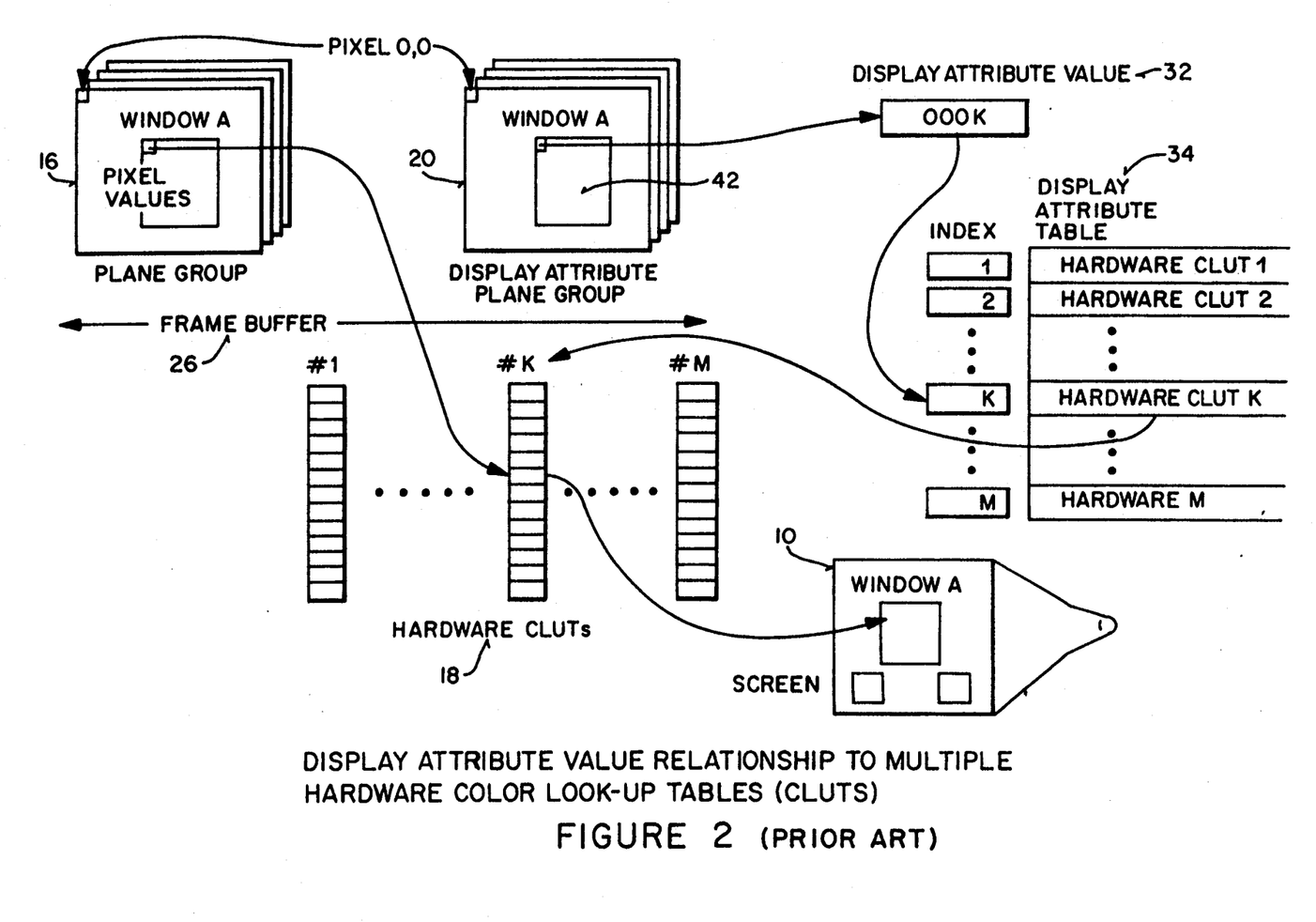
FIG. 2 is a diagram showing the relationship between the normal Image Data Plane Group of the Frame Buffer and the common implementation of associated Display Attribute Planes, Display Attribute Tables and Display Attribute Values in a multiple hardware colormap context.

Some present systems provide a scheme whereby the actual hardware CLUT used by a pixel on the screen is determined by the pixel's Display Attribute Value and a Display Attribute Table which is indexed by the Display Attribute Value. When a hardware CLUT is allocated to a client colormap the X11 Server paints the Display Attribute Plane Groups values for all the visible pixels of a window with one Display Attribute Value and sets the table entry for that value to use a particular hardware CLUT. Referring to FIG. 2 it can be seen that the Display Attribute Plane Group 20 corresponds to the Image Data Plane Group 16 both of which are a part of the Frame Buffer 26. The Image Data Plane Group 16 contains the Pixel values to be used as an index into the proper hardware CLUT containing the desired colormap. Window A 42 is referenced in the Display Attribute Plane Group 20 by a set of locations corresponding to the Pixels which define the geometry of Window A. Each Pixel location in the Display Attribute Plane Group 20 contains a display Attribute Value 32, which is an index into the Display Attribute Table 34 to obtain the ID of the particular hardware CLUT to which the colormap of Window A is assigned.

For a device with n hardware CLUTs and n display attributes, the X11 Server could always assure that the n most recently installed X11 colormaps will display correctly. This can be done using n display attribute values, each of which is set to display a different hardware CLUT. When a colormap is being installed, the X11 Server could paint all the windows using the colormap with the Display Attribute Value set to the least recently installed hardware CLUT, thereby making this CLUT the most recently installed one.

This is a simple scheme using the fewest possible Display Attribute Values but it has the severe disadvantage of painting the Display Attribute Planes of the Frame Buffer when a colormap is installed thereby making colormap installation slower than on displays which only have a single hardware CLUT which do not require the use of the Display Attribute Planes for this purpose. In addition, display attributes are also used for other graphics functions which implies that some colormaps would need more than one Display Attribute Value. The present invention reduces the need for painting these Display Attribute Planes of the Frame Buffer whenever a private colormap is installed, by creating a Colormap Object containing the colormap data as well as other data and operators. A DAIV is allocated for each Colormap Object and the assigned hardware CLUT is kept track of in the Colormap Object itself. This saves an enormous amount of processing time since rendering of the Display Attribute Planes is not necessary.

In addition, a Multiple Hardware Colormaps (MHC) system must not simply disallow the attempted installation of a new colormap when all of the hardware CLUTs are in use. Rather a proper scheme must allow the Most Recently Installed (MRI) colormap to replace the least recently installed one with the color degradation of other windows with colormaps installed occurring gracefully. For example, this MRI policy is implied by the X Window System use of a "required list" of installed colormaps.

Figure 3:
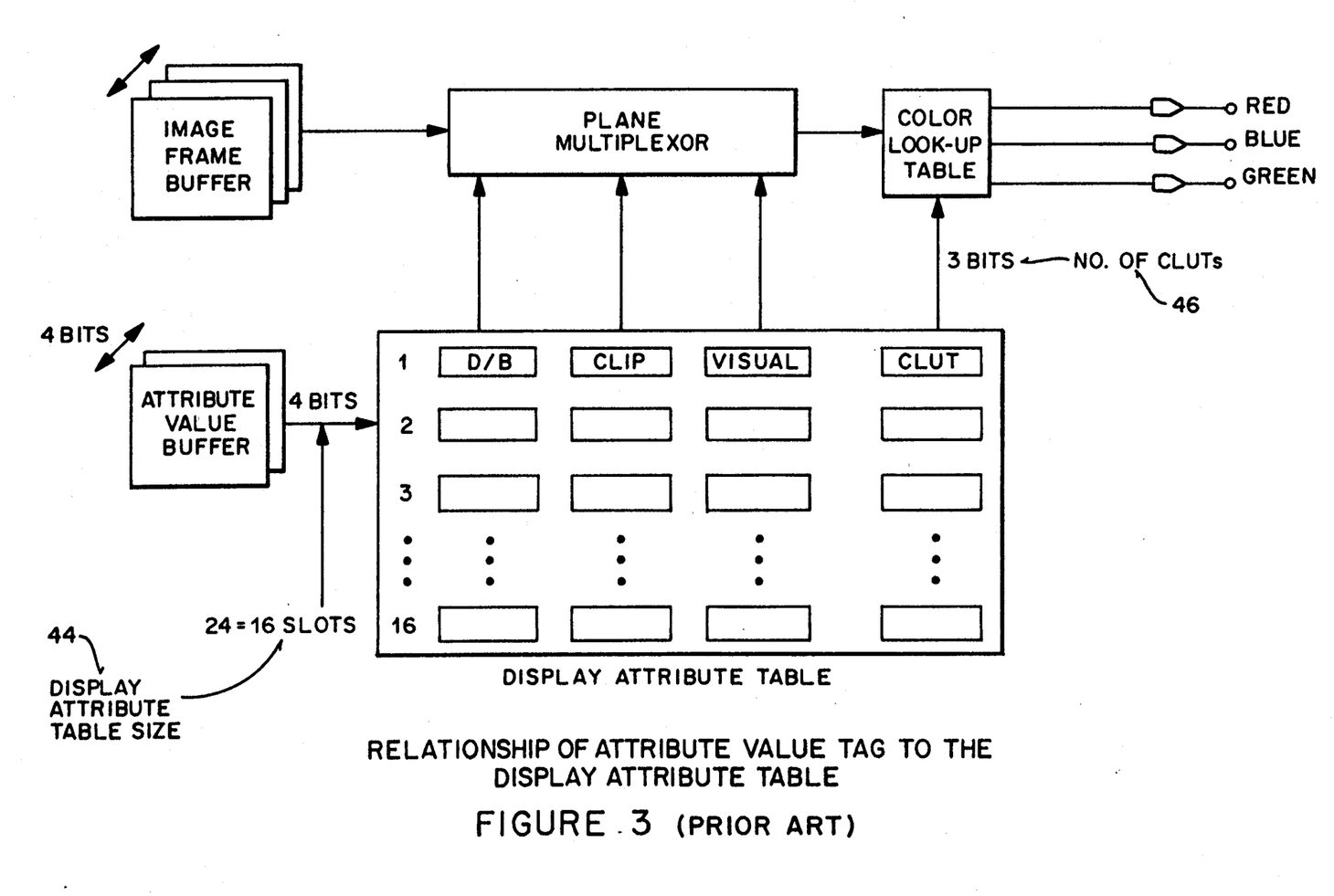
FIG. 3 is a diagram showing the old art relationship of attribute tag (or value) to a commonly used attribute table structure.

The Prior Art does not address these issues or imply an appropriate solution to the efficient handling of multiple hardware colormaps. A scheme for using a display attribute tag ( also called an index or attribute value) with an associated display attribute table to manage multiple hardware color look-up tables (CLUTs) is disclosed by Douglas Voorhies, David Kirk, and Olin Lathrop in a paper titled "Virtual Graphics" found in the Association of Computing Machinery, Proceedings of the Special Interest Group on Computer Graphics held in 1988 (SIGGRAPH 88) on pages 247 through 253. Referring to FIG. 3, the authors (on page 251 ) state that the actual number of windows is not limited by the display attribute table size 44 (16 entries in their example) "since several windows will often share the same attributes." The authors further state that the actual number of CLUTs 46 (8 in their example) is not a limitation since windows may share CLUTs or CLUT blocks. Consequently the authors disclose no method for controlling the assignment of these tags (display attribute identification values or indices) nor any scheme for managing the sharing of such display attribute identification values (or DAIVs as we call them herein) between windows with different colormaps. Moreover, regarding sharing of CLUTs or CLUT blocks, even when a 256 entry CLUT, for example, is divided into blocks of less than 256 colors, the problem remains of how to manage the blocks and block assignments themselves. Some hardware designs index fixed size blocks of color in a single CLUT with other bits which can be considered an extension of the display attribute. U.S. Pat. No. 4,772,881 Hannah (1988) discloses such a scheme. Experience has shown that severe degradation of performance and color flashing can occur when these Display Attribute Identification Value assignments are not managed and controlled, especially in the more advanced workstation environments described above.

Neither the Voorhies et. al. paper nor the following United Stated patents address these issues.

Priem et. al. U.S. Pat. No. 4,958,146 (1990) defines a multiplexer implementation of circuitry for performing Boolean Raster operations in a workstation whose functions include the display of graphic images using multiple planes and having foreground and background colors.

Yamamuro et. al. U.S. Pat. No. 4,908,610 (1990) defines a scheme for converting compressed color data in a graphics processor into uncompressed color data for storage in a frame buffer prior to usage for screen display.

Takashima U.S. Pat. No. 4,853,681 (1989) defines a hardware image frame composing circuit for early detection of a color value of transparency in a plurality of color look-up tables (CLUTs) in order to minimize the circuit size and insure the inherent delays do not impact the variety of colors available when high clock frequencies are used.

Van Aken et. al. U.S. Pat. No. 4,799,053 (1989) defines a scheme for both loading color values into the Color look-up table (CLUT) and recalling colors from the CLUT for use in video displays using a single set of address and data channels for both loading and look-up.

Work et. al. U.S. Pat. No. 4,769,632 (1988) discloses a color graphics control system, which may be incorporated in a single integrated chip, for generating electrical signal values for respective color inputs to a raster scan color display unit in response to a succession of pixel values derived from a pixel memory device, and using a color look-up table for obtaining the color values.

Hannah U.S. Pat. No. 4,772,881 (1988) discloses a method for using additional bits of data in the pixel value in the frame buffer to provide a way to designate different color values in a given color look-up table (CLUT) for the same pixel value. However this patent does not discuss methods for assigning and controlling these additional bits of data or for their use with multiple color look-up tables.

None of these patents individually or in combination read on the disclosed invention.

SUMMARY OF THE INVENTION

In the preferred embodiment of the disclosed invention, the goals are:
1. Provide the capability to efficiently use multiple hardware colormaps, according a defined priority of installation.

2. Impact the performance of the implementation for single colormap hardware as little as possible.
3. Keep the actual hardware manipulations abstracted from the Server code.

As to the Server, for example in the X11 Server environment, the desired behavior, is that on a device with n hardware color look-up tables (CLUTs) for a particular visual class, the n most recently installed colormaps will be correctly installed. This is referred to as the MRI policy. It is not always possible to meet this policy where the system does not have n Display Attribute Identification Values to dedicate to the last n installed colormaps. Accordingly, the present invention, through its use of a Colormap Object meets these objectives by the management of windows of similar flavor (i.e. depth and class of use) and their related Colormap Objects and by its unique approach to implementing the MRI policy. The mechanism for retaining the Display Attribute Identification Values in a Colormap Object associated with its related windows avoids the time consuming painting of Display Attribute Planes whenever a new colormap is installed.

It is therefore an object of the present invention to provide a scheme that manages the limited resources, Hardware Color Look-up Tables (CLUTs) and Display Attribute Identification Values, and implements the most recently installed (MRI) policy for colormaps, with a minimum of rendering to the Display Attribute Planes of the Frame Buffer on colormap installation.

It is a further object of the present invention to provide a scheme which gracefully degenerates to some "color flashing" when Display Attribute Identification Values are exhausted, allows Display Attribute Identification Values to be decoupled from colormap management and used for more graphics intensive functions like double buffering, when needed, and finally, one which dynamically regenerates when Display Attribute Identification Values are available again.

According to the disclosed invention, an apparatus and method are disclosed, wherein at least one device designated a Colormap Object is used each time a Window is displayed on the screen. Data such as the colormap data associated with the Window, the Window's Visual type and it's other display characteristics are retained in the Colormap Object. The specific display characteristics and use of the Window ( that is, all display attributes except the CLUT ID) are designated the "Flavor" of the Window. Also at the time a Window is created, (for example, by calling XCreateWindow, XCreateSimpleWindow, XChangeWindowAttributes, or XSetWindowColormap) a Colormap Object is associated with the Window and the invention assigns a DAIV to this Colormap Object and Window Flavor combination, if one like it does not already exist, and if a DAIV is available. If there is not already assigned a DAIV for a Colormap Object and Window Flavor combination like the newly created combination and if there are no unassigned DAIVs, the invention causes the Colormap Object to share a DAIV with other Colormap Objects if possible. This sharing of a DAIV between more than one Colormap Objects is called "overloading"

The invention then recognizes a request to "install" the colormap data for this new Window, and assigns an appropriate Hardware Color Look-up Table (CLUT) to the Colormap Object associated with this request. In the presently preferred embodiment, a storage mechanism (the "Window Binding Store") is provided for keeping track of Colormap Objects and window flavor combinations. This storage mechanism maintains the set of all windows of the same flavor and Colormap Object type, as well as the set of Colormap Objects whose windows, because of their specific use, require unique flavors (i.e. are not shareable). This storage mechanism also maintains the chronology of installed Colormap Objects as a device to support the "Most Recently Installed" (MRI) policy.

Finally, this Display Attribute Identification Value Assignment System keeps the Window Binding Store updated, not only as a part of assigning a new value, but also upon recognizing that a Colormap Object is no longer in use or that a Window has been destroyed. In that event, the Assignment System releases the resources of the uninstalled Colormap Object or Window, alleviates overloading if possible, because of the newly available resources, and updates the Window Binding Store wherever required.

DETAILED DESCRIPTION OF THE PRESENT INVENTION

An improved video color Display Attribute Identification Value Assignment apparatus and method are described for the management of multiple colormaps in a raster scanned display which provides for n hardware color look-up tables (CLUTs), where n may be 1 or greater and the number of colormaps desired by users may be greater than n. The invention provides a scheme for managing the limited resources, hardware CLUTs and Display Attribute Identification Values (DAIVs), and implements the "Most Recently Installed" (MRI) policy for colormaps, with a minimum of rendering of the Display Attribute Planes of the Frame Buffer upon colormap installation. The invention also provides a scheme to minimize "color flashing" when DAIVs are exhausted. Further, the improvement allows DAIVs to be decoupled from colormap management and used for more graphics intensive functions like double-buffering, when needed. Finally, the invention dynamically reallocates resources to relieve any forced overloading when once used display attributes have been released. In the following description, numerous specific details are set forth such as specific program calls, data structures, arguments, bit values, etc., in order to provide a thorough understanding of the present invention and the preferred embodiment at this time. These specificities should not be construed as limiting the scope of the invention but as merely providing illustrations of the presently preferred embodiment. It will be obvious, however, to one skilled in the art that these specific details are not needed to practice the invention. In other instances, well known operations are shown in block diagram form in order not to obscure the present invention.

ASSIGNING DISPLAY ATTRIBUTE IDENTIFICATION VALUES

Figure 4:
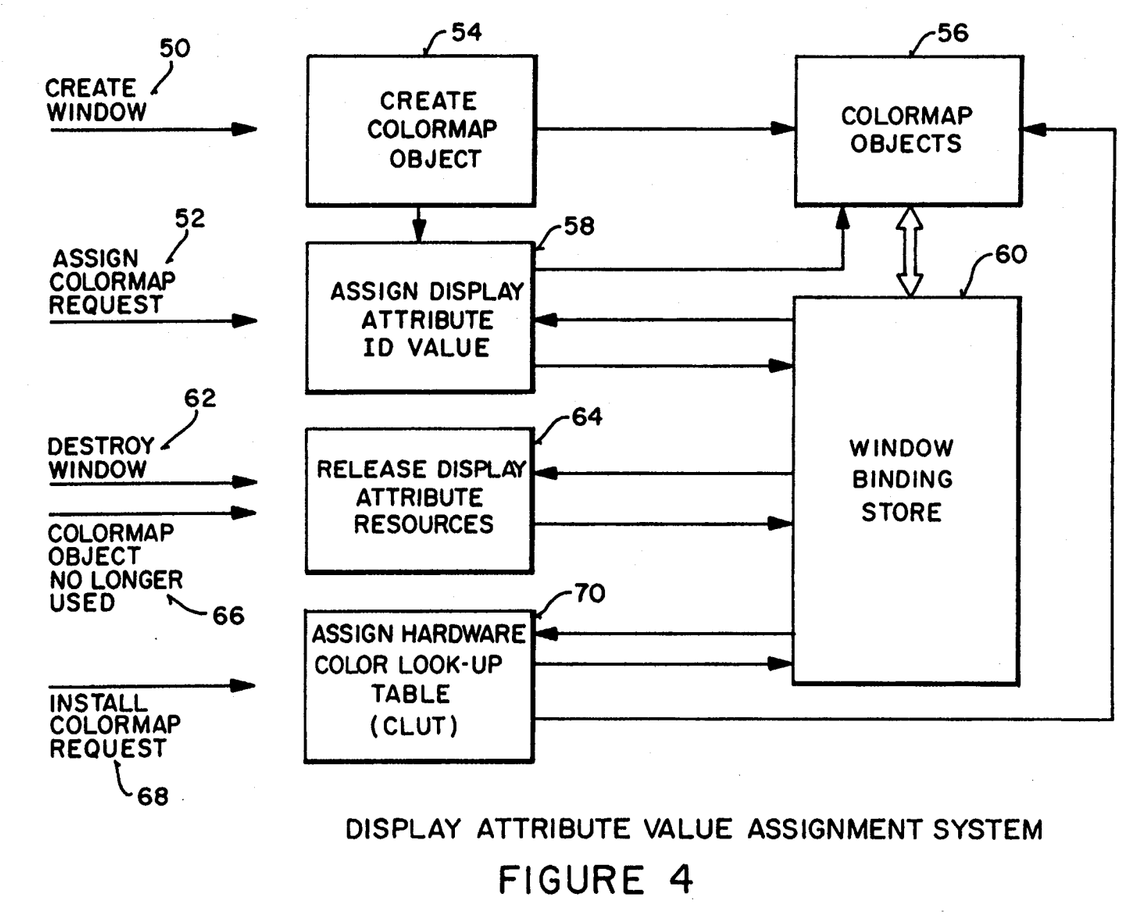
FIG. 4 shows a high level block diagram of the disclosed Display Attribute Value Assignment System.
Figure 5:
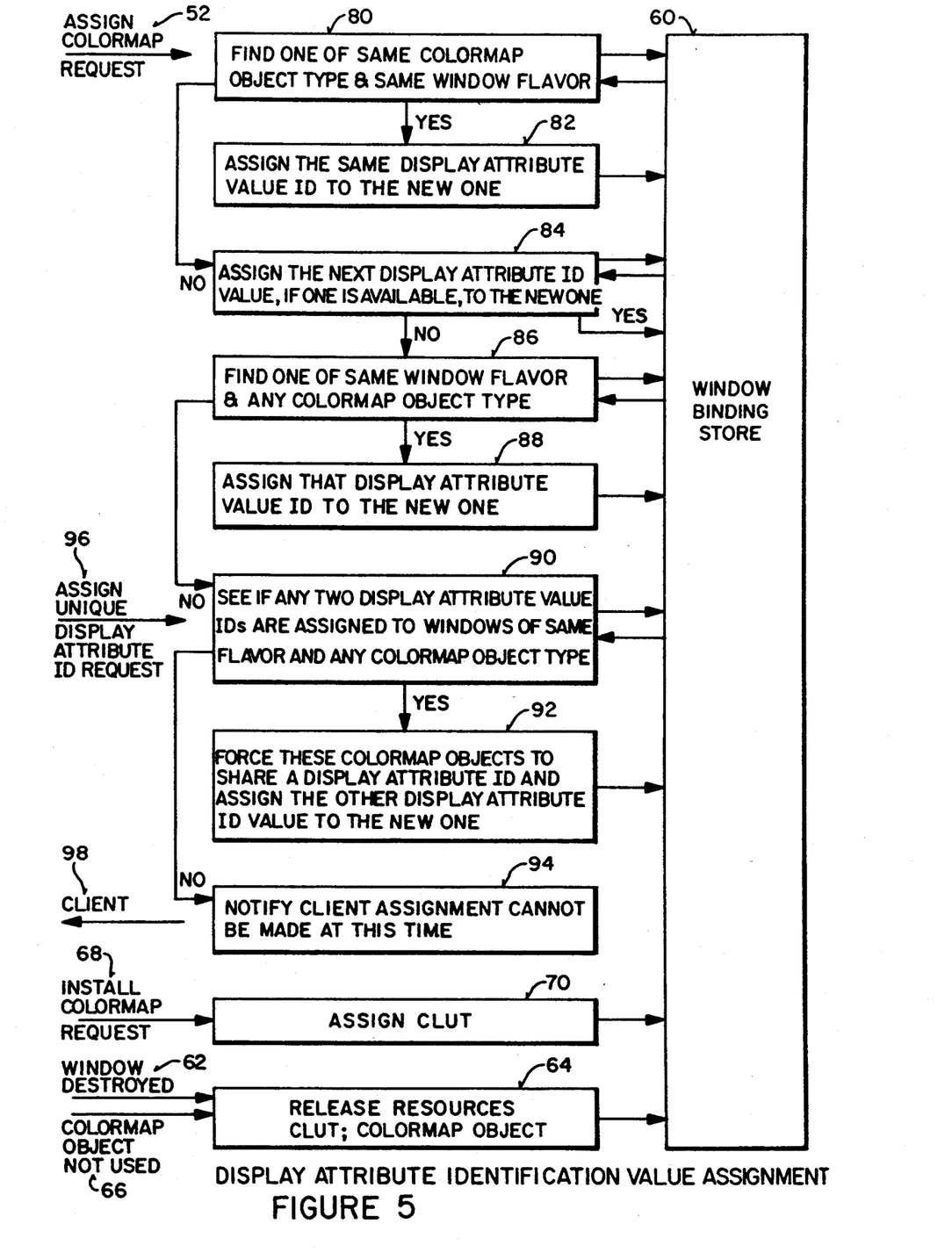
FIG. 5 shows a more detailed block diagram of the Preferred Embodiment of the Display Attribute Identification Value Assignment System.
Figure 6:
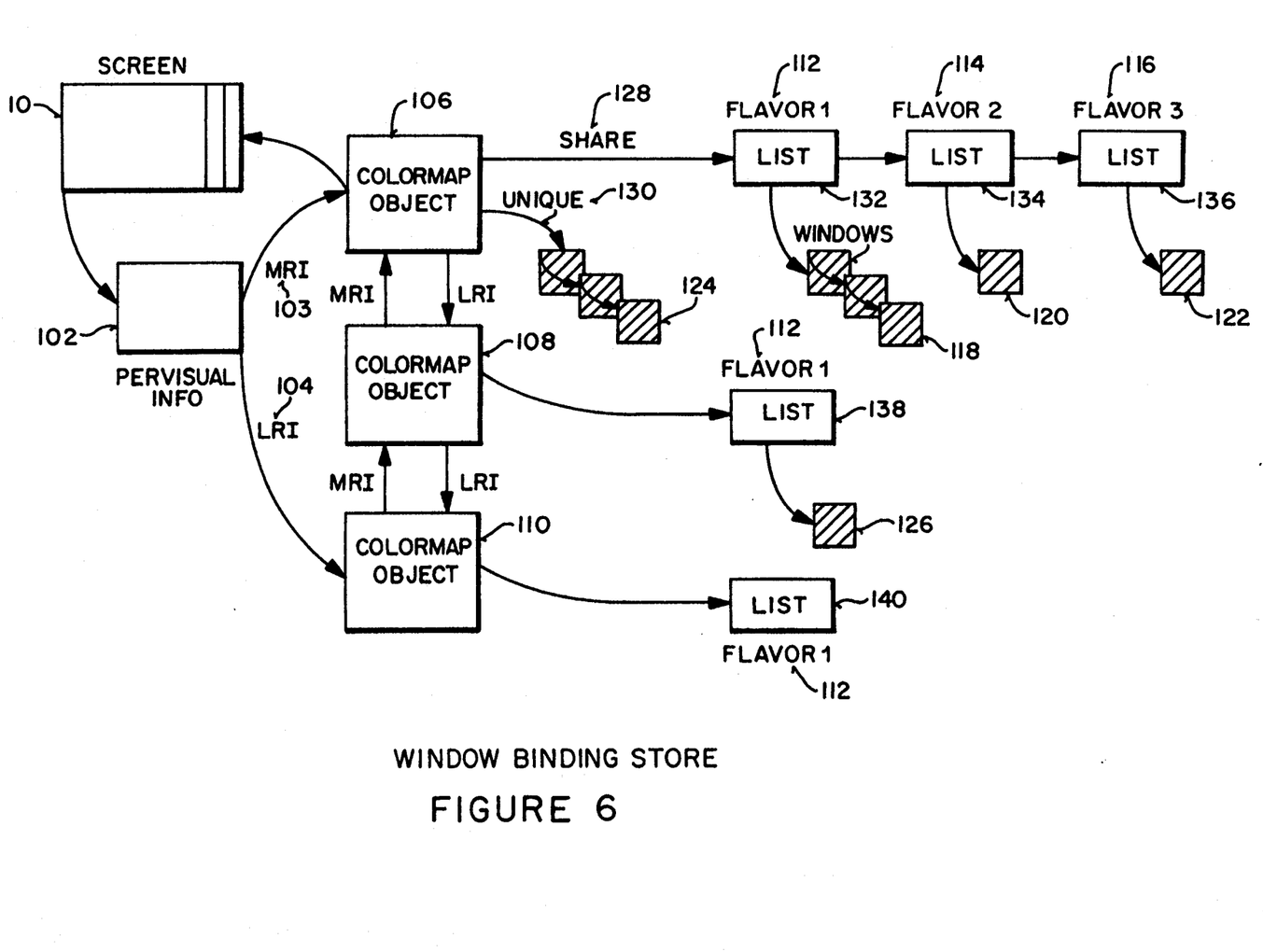
FIG. 6 is a general diagram showing a scheme for storing Colormap Objects and Window Flavor combinations which is used by the Assignment System in the preferred embodiment of the present invention. This relationship may be used to implement the MRI policy given a finite number of Display Attribute Identification Values.

The following describes the preferred embodiment in terms of FIGS. 4 through 6 and the operators used. The data storage device which is used in the preferred embodiment for maintaining the status of Colormap Object and Window Flavor combinations is described first. This device is termed the "Window Binding Store". Referring to FIG. 6, there is shown the relationship between a screen 10 and the related colormaps and windows. Each screen 10 has associated with it a VISUAL INFO structure which describes all the possible Visual types for the device by pointing to a list of PERVISUALINFO structures. 102

Each PERVISUALINFO structure 102 describes a Visual type in detail with static information, such as the number of bits per pixel as well as dynamic information. Of concern to this invention are the data used to maintain a doubly linked list of Colormap Objects, the Colormap List. The pointer Iri 104 and mri 103 point to the head and the tail of the Colormap List 106, 108 and 110. The pointers mri 103 points to the Colormap Object that was most recently installed 106 and the pointer Iri 104 points to the least recently installed Colormap Object 110.

In order to implement the Most Recently Installed (MRI) policy each Colormap Object must be allocated a separate DAIV which can be used by all windows which work with that Colormap Object. In fact, a DAIV must be reserved for each flavor of window 112, 114, 116. For each flavor there is a list, called the Flavor List, of all windows which share a Colormap Object 132, 134, 136. The list of Flavor Lists is pointed to by the share field 128 of the Colormap Object. Windows that have their own unique DAIV are maintained in the Unique List 130.

Referring to FIG. 4, when a user, as for example an X Window System Client issues an XCreateColormap request 50 the present invention is invoked and a Colormap Object 56 is created by the Create Colormap Object Routine 54 and is added to the Window Binding Store by inserting it into the Colormap List for it's Visual type.

Next an Assign Colormap Request 52 (which results, in the X Window System for example, from any one of the following X11 requests XCreateWindow, XCreateSimpleWindow, XChangeWindowAttributes, or XSetWindowColormap requests) indicating that the Client wants to use a particular set of colors for his window display is recognized. The Assign Colormap Request 52 causes the Assign DAIV mechanism 58 to be invoked.

Assign DAIV searches the "Window Binding Store" 60 to determine whether a DAIV of the same flavor exists for the colormap being assigned. If one already exists then the window is added to Window Binding Store 60.

If a DAIV does not exist of the same flavor for the Colormap Object, the Assignment System determines whether an unused DAIV is available. If one is available the Window Binding Store 60 is augmented to include the present flavor and the window is placed in the Window Binding Store.

If however, a DAIV is not available, the Assignment System must scan the present Window Binding Store 60 to determine whether it can overload a presently assigned DAIV. These steps, as used in the preferred embodiment, are shown more clearly and in more detail in FIG. 5. Referring now to FIG. 5, the Assignment System first checks the Window Binding Store 60 to see if there already exists a combination of Colormap Object type and Window Flavor like that of the newly created combination 80. If a combination like the one requested is found, the System will assign the same DAIV to the new Colormap Object and Window combination 82 and these data will be added to the Window Binding Store 60.

If no identical Colormap Object and Window flavor combination was found, the System checks to see if an unused DAIV is available. If an unused DAIV is available, it is assigned to the new Window Flavor and Colormap Object combination 84. Again the Window Binding Store 60 is updated. If no unused DAIV is available, the Assignment System tries to find a combination of the same Window Flavor and any Colormap Object which has an assigned DAIV 86. If one of these is found to match the flavor of the window which triggered the Assign Colormap Request, then the same DAIV is assigned to the new Window Flavor and Colormap Object combination 88. The new Window Flavor and Colormap Object combination and the one found would both share the same DAIV and would be said to be "overloaded". They are both placed in a part of the Window Binding Store 60 called an Overload Set. There is one such set for each DAIV that is used for more than one Window Flavor and Colormap Object combination. Again the Window Binding store 60 is updated.

If no match of Window Flavors at all can be found, the Assignment System then attempts to force two existing DAIVs to be combined, releasing one of these values. This is performed by the Force Overload operator (90,92,& 94). It is done by again scanning the Window Binding Store 60 to see if any two DAIVs are assigned to two windows of the same flavor regardless of Colormap Object type 90. These windows will necessarily be of a different flavor than the flavor of the window for which the Assign Colormap request has been issued, because previously a search had been made for a window of that flavor and none was found. Furthermore these windows will be using different Colormaps Objects because if they were of the same flavor and Colormap Object they would be already using a single DAIV.

If the Force Overload operator finds two windows of identical flavor, and at least one of them is not already overloaded, it combines them under a single DAIV. These two windows are now considered overloaded and are linked together in an Overload Set. The net result of this operation is that one DAIV is released. If this occurs, the Assignment system assigns this released DAIV to the Window Flavor and Colormap Object combination which triggered the Assign Colormap Request 92. Finally the revised DAIVs are recorded in the Window Binding Store 60.

Note that if a window requires a unique DAIV and no unassigned values are available, this operation of forcing an overload of existing DAIVs, Force Overload (90,92,& , 94), would again be required. A unique the least recently installed Colormap Object and overloads the DAIV of the first one found of the same flavor that is not already overloaded. If none can be found, the list is searched again for one of the same flavor even if it is already overloaded.

The pseudo code describing these operators in the presently preferred embodiment is as follows:

```
Assign DAIV (Cmap, Window)
Inputs: Cmap      - the colormap to be assigned
        Window    - the window that the colormap is to be assigned to
f = flavor of Window
Search the Cmap's list of Flavor Lists for an existing list with flavor f
If one if found, call it found_list then
    Free the DAIV currently used by Window
    Assign the DAIV from the found_list to Window
    Insert Window into found_list
else
    Create a new Flavor List and add it to the list of Flavor Lists,
    call it newlist
    Free the DAIV currently used by Window
    Insert Window into newlist
    If an unused DAIV exists, call it d, then
        Assign d to Window
else
    Search the Colormap List from least recently installed (lri) until a
        Colormap other than Cmap, call it Cmap1, is found
        with a Flavor list of flavor f
    If one is found then
        Cmap and Cmap1 are linked together in an Overload Set
        Assign the DAIV from the Cmap1 Flavor List of flavor f to Window
    else
        Invoke the Force Overload Operator passing it the Colormap List to
            which Cmap belongs
        If an unused DAIV exists now, call it d, then
            Assign d to Window
        else
            error: System cannot have any more flavors, notify client
Force Overload (cmap_list)
Inputs: cmap_list - a list of Colormap Objects for a particular
        PER_VISUAL_INFO.
For each colormap in cmap_list, cmap, starting from lri to mri do
    For each Flavor List, flist, in cmap that is not overloaded do
        Try for another Flavor List that is not overloaded:
        For each colormap in cmap_list excluding cmap,
            call it other_cmap, do
            If other_Cmap has a Flavor List, other_flist, with the same
            flavor as flist that is not already overloaded then
                Release the DAIV from other_flist
                Select the DAIV from flist and assign it to other_flist
                insert other_flist and flist into an Overload Set
                return success
        Try for another Flavor List even if it already is overloaded:
        For each colormap in cmap_list excluding cmap,
            call it other_cmap, do
            If other_cmap has a Flavor List, other_flist, with the same
            flavor as flist then
                Release the DAIV from other_flist
                Select the DAIV from flist and assign it to other_flist
                insert other_flist and flist in an Overload Set
                return success
return failure because no overload was performed
```

DAIV would be needed if the window requires double-buffering or special clipping. The Assign Unique DAIV request 96 is issued and the present invention, in the preferred embodiment, would again call the Force Overload operator to try to force an overload or sharing of existing DAIVs in order to make one available for this new request.

Finally, if no assignment of a DAIV can be made to the window triggering the Assign Colormap Request 52 or the Assign Unique DAIV request 96, the Client is notified that the request is denied at this time 94.

This policy of only overloading among windows of the same flavor insures that the "flashing" that occurs will only be of the wrong color and not of the wrong display type. The overloading policy selects first from From the above it can be seen that the present invention dynamically controls the assignment of DAIVs which are a scarce resource in most workstations, and especially in the environment of varied display demands of newer, faster workstations.

RELEASING DISPLAY ATTRIBUTE IDENTIFICATION VALUES

In order to properly maintain the Window Binding Store, the present invention includes a mechanism for monitoring the destruction of windows by Clients, and associated uninstallation of related colormaps. Referring again to FIG. 4, when a Destroy Window 62 or Colormap Object No Longer Used 66 indication is received, the invention causes the associated Display Attribute Resource to be released 64. In the preferred embodiment, for example when the X11 Colormap is freed or a window is destroyed, the Assignment System scans the Window Binding Store 60 to remove structures no longer needed and release any overloads 64 whenever possible.

More specifically, in the presently preferred embodiment, in response to an X11 XDestroyWindow or XFreeColormap request, the operator UnbindWindowColormap is called with arguments a Colormap Object and a window. If the window is in one of the Flavor Lists (128 in FIG. 6) of the Colormap Object or the Unique List 130, it is removed. If the Flavor List empties then if that flavor happens to be overloading a DAIV, it is removed from the Overload Set. If there is only one remaining Flavor List in the Overload Set then it is marked as not overloaded.

In the event that the Flavor List is not overloaded and emptied or the window had a unique DAIV the system detects that a DAIV has been made available and calls the Release Overload operator. This operator can be called whenever a DAIV has been freed, for example when a window has been destroyed. It goes through a Colormap List looking for Flavor Lists such as 132,134,136,138,140 that are overloaded at the time. If it finds one, it allocates an unused DAIV and assigns it to all the windows in the list and marks that Flavor List as not overloaded and removes it from it's Overload Set. If there is only one remaining Flavor List in the Overload Set then it too is marked as not overloaded.

The pseudo code for UnbindWindowColormap and Release Overload follows:

```
Unbind_Window_Colormap(cmap, window)
Inputs:
  cmap   - The Colormap Object to be disassociated from
  window - The Window Object
  if window has a unique DAIV then
     remove window from the Unique List of cmap
     invoke Release Overload for the Colormap List of which cmap is a member
  else
     f = flavor of window
     Find window in the Flavor List, flist, of flavor f of cmap
     if found then
        remove window from flist
        if flist is empty then
           if flist was overloaded then
              remove flist from it's Overload Set
              if there is only one Flavor List, last_list, left in
              the Overload Set then
                 mark last_list as not overloaded and remove from the set
           else
              invoke Release Overload for the Colormap List of which cmap is
              a member
Release Overload (clist)
Inputs:
  clist      - A Colormap List
  Search clist starting from the mri to the lri until a Colormap Object is
  found with a Flavor List, flist, that is overloaded
  If found then
     If an unused DAIV, d, exists then
        Assign d to all windows in flist
        remove flist from it's Overload Set
        If there is only Flavor List, last_list, left in
        the Overload Set then
           mark last_list as not overloaded and remove from the set
```

This mechanism of dynamically alleviating overloaded lists where possible insures that the usage of the scarce DAIVs is always maximized.

HARDWARE COLOR LOOK-UP TABLE ASSIGNMENT

The present invention, in addition to managing the scarce DAIV resource, also manages the scarce Hardware Color Look-up Table (CLUT) resource. This may be done by a number of means, as for example, by means of the Window Binding Store shown in FIG. 6.

Referring again to FIG. 4, in the preferred embodiment, when a Colormap "Install" Request 68 is received from a client, the Assign Hardware colormap Look-up Table (CLUT) apparatus 70 scans the Window Binding Store 60 to find whether a CLUT is available. If no CLUT is available, then one is stolen from the least recently installed Colormap Object (110 in FIG. 6) and assigned to the new request. This new Colormap Object is now placed at the head of the list (Most Recently Installed) (106 in FIG. 6). In the presently preferred embodiment of this function, the apparatus for assigning the CLUT calls the operator Install Colormap.

The purpose of Install Colormap is to make all the windows associated with the Colormap Object appear correctly on the device. It is described in pseudo code as follows:

```
Install Colormap (cmap)
Inputs:
   cmap     - Colormap Object to install
   clist = Colormap List to which cmap belongs
   Place cmap as the most recently installed Colormap Object on clist
   If cmap is not currently installed then
      If there is an available CLUT then
```

```
        c = available CLUT
    else
        go through clist starting from lri to mri, until one is found that is
            currently installed, call that Colormap Object bumped
            mark bumped as not installed
        c = CLUT currently used by bumped
    set all the Display Attribute Table (34 in FIG. 2) entries for all the
    DAIVs used by all Flavor Lists and all unique DAIVS to use CLUT c
    Write the Colormap data in cmap into the CLUT c
    mark cmap as installed
```

RELEASE HARDWARE CLUT

In the preferred embodiment, the Window Binding Store (FIG. 6) is further maintained whenever hardware CLUTs are released through an Uninstall request. The Window Binding Store is scanned and the uninstalled Colormap Object is removed from the Colormap List (103 and 104 in FIG. 6). Any CLUT which was assigned to the removed Colormap Object is made available or reassigned to a Colormap Object which is currently not installed. In the present embodiment these operations are performed by the operator Uninstall Colormap. The pseudo code for this operator is:

```
Uninstall Colormap (cmap)
Inputs:
    cmap    - The Colormap Object to uninstall
    clist = Colormap List to which cmap belongs
    remove cmap from clist
    if cmap is marked installed then
        c = CLUT used by cmap
        go through clist starting with the mri toward lri until one is found
            that is not marked as installed, call that one bumped
        if bumped was found then
            set all the Display Attribute Table entries for all the DAIVS used by
                all Flavor Lists and all unique DAIVS to use CLUT c
            Write the Colormap data in cmap into the CLUT c
            mark bumped as installed
    mark cmap as uninstalled
```

Accordingly, the above description of the present invention can be seen to effectively manage the assignment of the scarce DAIVs and scarce hardware CLUTs in a graphics workstation with multiple windows where the demands for these resources exceed the resources available. Moreover, it can be seen that the X Window System Most Recently Installed (MRI) policy for multiple hardware CLUTs is observed. Finally, it can be seen that maintaining the hardware CLUT index in the Colormap Object avoids the time consuming loading of the Display Attribute Planes except when the Display Attribute Identification Value itself has changed for a window.

As this invention may be embodied in several forms without departing from the spirit of the essential characteristics thereof, the present embodiment is therefore illustrative and not restrictive, since the scope of the invention is defined by the appended claims rather than by the description preceding them, and all changes that fall within the metes and bounds thereof are therefore intended to be embraced by the claims.

We claim:

1. In a bit mapped color display system which accommodates the display of multiple windows, an apparatus for controlling the assignment of display attribute identification values and hardware color look-up tables, comprising;
   a) a plurality of hardware color look-up tables:
   b) a mechanism for creating colormap objects, coupled to said plurality of hardware color look-up tables, said colormap objects containing a data structure comprising a colormap and a plurality of display attribute data, and said colormap objects also containing one or more program operators;
   c) a first control facility, coupled to the mechanism for creating colormap objects, said first control facility having devices to establish and assign a finite number of display attribute identification values, said display attribute identification values being distinct from window identification numbers, and having devices for linking windows to the colormap objects and for assigning said finite number of display attribute identification values to the colormap objects, rearranging a previous assignment of said finite number of display attribute identification values if necessary;and
   d) a second control facility coupled to said first control facility for assigning one of said plurality of hardware color look-up tables to a designated colormap object, said designated colormap object sharing an existing one of said finite number of display attribute identification values with other colormap objects if necessary,
   whereby said finite number of display attribute identification value can be assigned to multiple colormap objects which are linked to multiple windows.

2. The apparatus defined in claim 1 further comprising a storage device coupled to the mechanism for creating colormap objects for storing said colormap objects in chronological order of colormap installations.

3. The apparatus defined in claim 2 wherein the first control facility assigns a separate display attribute identification value to a window flavor group, said window flavor group comprising said windows having a common window flavor, with each said window flavor group being linked to the colormap object associated with said windows belonging to said window flavor group.

4. The apparatus defined in claim 3 further comprising a third control facility coupled to said storage device for updating said storage device when any of said colormap objects or said hardware color look-up tables are no longer required.

5. The apparatus defined in claim 4 wherein said apparatus functions in an X WINDOWS SYSTEM protocol environment.

6. The apparatus defined in claim 2 wherein said storage device comprises a programmable device.

7. The apparatus defined in claim 2 wherein said storage device comprises a random access memory device.

8. The apparatus defined in claim 3 wherein the first control facility causes an existing window to share a display attribute identification value with another window having a same window flavor when all of the finite number of display attribute identification values are in use, thereby making a display attribute identification value available for assignment to a new window which requires a display attribute identification value.

9. In a bit mapped color display system which accommodates the display of multiple windows, and which provides a plurality of hardware color look-up tables a method for controlling the assignment of display attribute identification values and said hardware color look-up tables, comprising the steps of;

a) establishing a display attribute identification value assignment mechanism having devices to establish and as assign a finite number of display attribute identification values, said display attribute identification values being distinct from window identification numbers:

b) establishing one or more colormap objects, said colormap objects containing a data structure comprising a colormap and a plurality of display attribute data, and said colormap objects also containing one or more program operators;

b) linking new windows to a designated colormap object and assigning one of said finite number of display attribute identification values to said new windows, rearranging a previous assignment of said finite number of display attribute identification values if necessary; and c) assigning a hardware color look-up table to said designated colormap object, whereby the colormap contained in the designated colormap object may share an existing one of said finite number of display attribute identification values with more than one window, 10. The method defined in claim 9 further comprising the additional step of maintaining a plurality of lists of said most recently installed colormap objects and related windows, and data indicating the display attribute identification value assigned to each of said windows and an identification of the hardware color look-up table assigned to each of said colormap objects.

11. The method defined in claim 10 further comprising an additional step for updating said plurality of lists when any of said colormap objects or said hardware color look-up tables are no longer required.

12. The method defined in claim 11 wherein said method functions in an X WINDOWS SYSTEM protocol environment.

* * * * *